United States Patent [19]
DeSena

[11] Patent Number: 5,578,260
[45] Date of Patent: Nov. 26, 1996

[54] APPARATUS AND PROCESS FOR MAKING A MOLD OF THE FOOT, ANKLE, AND LOWER LEG

[76] Inventor: Danforth DeSena, 4 Ivie Rd., Cape Elizabeth, Me. 04107

[21] Appl. No.: 319,151

[22] Filed: Oct. 6, 1994

[51] Int. Cl.⁶ ................................................ B29C 33/40
[52] U.S. Cl. ................................................ 264/223; 425/2
[58] Field of Search .................................... 264/222, 223, 264/DIG. 30; 425/2; 249/55

[56] References Cited

U.S. PATENT DOCUMENTS

| | | | |
|---|---|---|---|
| 1,661,425 | 3/1928 | Hess | 425/2 |
| 1,824,835 | 9/1931 | Pierce | 249/55 |
| 2,472,754 | 6/1949 | Mead | 264/DIG. 30 |
| 2,917,782 | 12/1959 | Goldwag | 264/223 |
| 4,747,989 | 5/1988 | Peterson | 264/223 |
| 4,979,252 | 12/1990 | Daley | 425/2 |

FOREIGN PATENT DOCUMENTS 604935  9/1960  Canada ................................ 264/223

*Primary Examiner*—Robert Davis
*Attorney, Agent, or Firm*—Chris A. Caseiro; Thomas L. Bohan

[57] ABSTRACT

A system and method for making an impression of a foot, an ankle, and a lower leg to be used in the fabrication of custom-made shoes. The system has a molding component made of a compressible foam or a combination of compressible foams made into prefabricated pieces, and a protective component made of plastic, cardboard, or other disposable material enclosing the molding component. The protective component may be securely affixed to the molding component and is designed to be used for mailing or storing the foot-ankle-lower leg impression.

18 Claims, 3 Drawing Sheets

APPARATUS AND PROCESS FOR MAKING A MOLD OF THE FOOT, ANKLE, AND LOWER LEG

BACKGROUND OF THE INVENTION

1. Field of the Invention

The present invention relates to a system for making an impression of an object. More particularly, the present invention is a device to capture the three-dimensional shape and size of an object without the use of plaster of Paris. Yet more particularly, the present invention is a device which incorporates a plurality of pre-fabricated units of formable material within a container. Still more particularly, the present invention is a system for making an impression of an entire foot, ankle, and lower leg simultaneously. Finally, the present invention is a system for quickly making an impression of a foot, ankle, and lower leg that requires no seam release agent, that is clean to use, that has minimizes the possibility of user error, that is cost effective, and that has containing means capable of functioning as a mailing carton for sending the impression to a manufacturing facility.

2. Description of the Prior Art

Molds and methods of making molds or cast fabrication have been around for a very long time. The early development of pottery where the shape of an object was formed with a clay mixture and then dried and solidified in a high temperature kiln may lay claim to the initial idea of molding shapes. For instance, the ancient method of making bricks with clay, straw, and water required the use of simple, rectangular molds for shaping the finished bricks. With the development of plaster of Paris, mold-making without the requirement of high temperature drying ovens became possible.

Although most of the "modern day" methods of mold-making have involved the use of plaster of Paris, some have involved the use of a combination of a flexible material filled with a mixture of sand and a fluid. Once formed around an object, the fluid is removed through a drain equipped with a filter and the remaining sand solidifies to a sufficient extend permitting the mold to retain its impression of the object. For the most part, the field of mold making, and particularly the field of foot impressions, has employed the use of plaster of Paris. More recently, however, there has become available foam-box kits for making impressions of the sole of a foot.

Full foot-ankle-lower leg impressions are important in the custom footwear industry. Particularly in the area of orthopedic shoes for diabetics, the demand for full foot-ankle-lower leg impressions will increase. Their use by diabetics has been shown to reduce the number of foot amputations, a drastic and not infrequent result of severe diabetes.

The specific problems associated with the current methods of taking foot impressions have lead to the development of the present invention. The drawback of using plaster of Paris is that it is very messy, that it requires the use of a release agent, and that the patient's foot must remain in a fixed position within the plaster of Paris for approximately thirty minutes to allow the plaster of Paris to set. The newer compressible foam impression systems reduce the time required to complete a foot impression; however, these systems are generally restricted to making sole impressions.

Several attempts at designing devices and methods of mold making have been undertaken. U.S. Pat. No. 84,979, 252 issued to Daley, U.S. Pat. No. 2,472,754 issued to Mead, U.S. Pat. No. 1,824,835 issued to Pierce, and a product called Bio-Foam, manufactured by Smithers Bio-Medical Systems, Kent, Ohio, teach such devices.

Daley provides for an apparatus and a method for making custom insoles. The custom insole is made up of a plurality of layers of a thermoformable material that conform in size and contour to the bottom surface of a foot. The method of making the insole involves placing an unformed blank of the thermoformable material on a casting platform which in turn is on a horizontal surface. A foot is placed on top of the unformed blank and pressure is applied downwardly. The foot and then the blank is removed from the casting platform. Although this system is an attractive method of creating custom insoles, it is incapable of producing a mold of the entire foot, ankle, and lower leg.

Mead provides for a method of making and maintaining an impression of the shape of a human foot. The method involves the use of a flexible material, forming an enclosing "bladder" which is filled with a sand/fluid mixture, as the substrate for mold formation. At least three separate bladders are used for creating the impression of the human foot. Reduction of the fluid pressure within each bladder through an attached hand valve creates a "solidified" mold with the remaining sand. Even though this method is capable of producing a mold of the foot, ankle, and lower leg, it is cumbersome, time-consuming, may not be completely accurate, and requires various pieces of relatively expensive equipment.

Pierce provides for a device for taking foot impressions in a plaster of Paris cast to aid in the construction of footwear. The device is a mold of foot-shaped design embodying a base and a sectional foot-shaped shell for confining the plaster of Paris about the foot to produce an accurate impression. This system represents the traditional method used. In the traditional casting of the foot, ankle, and lower leg, a bivalve process is used. After application of a seam-release agent, the bottom half of the foot and the posterior ankle region are molded first, then the top half of the foot and the anterior ankle are molded to complete the cast. After hardening, the cast is opened along a seam by pulling a pair of wires, which were placed within the mold during the initial setup, thereby cutting the seam to allow release of the foot. As mentioned above, the major drawbacks of this system are the mess involved in making the plaster of Paris, the need for applying a release agent to the appendage, and the lengthy set time required for the plaster of Paris.

Smithers Bio-Medical Systems provides a system, called Bio-Foam Impression Foam System, for capturing the impression of the plantar foot surface. The foam is a compressible foam formulated to capture fine details of the sole of the foot. It is available in bulk, double-slab, and single-tray compression kits. A key problem with this system is that it fails to provide the means to take an impression of the entire foot, ankle, and lower leg.

Therefore, what is needed is a system for making an impression of a foot, an ankle, and a lower leg simultaneously. What is further needed is a system that does not involve the tedious and messy fabrication of a mold using plaster of Paris. What is still further needed is a system that does not require the use of a seam-release agent for separating the object being molded from the molding media. Finally, what is needed is a system that is convenient, easy to use, economical, and capable of making an impression of not only the sole of the foot, but a foot, an ankle, and lower leg in a self-contained disposable container useful for mailing and storing purposes.

SUMMARY OF THE INVENTION

It is an object of the present invention to provide a system for taking an accurate impression of a foot, an ankle, and a lower leg simultaneously. It is another object of the present invention to provide a system that does not involve the tedious and messy fabrication of a mold using plaster of Paris or involve the use of a seam-release agent. It is a further object of the present invention to provide a convenient, easy-to-use, and economical system for making an impression of the foot, ankle, and lower leg that is housed in a disposable container useful for mailing and storing purposes.

These and other objectives are achieved in the present invention by a combination of a first mold component incorporating a molding component means enclosed by a second mold component being a protective component. The present invention uses a combination of these two relatively simple components arranged in a specially-designed configuration enabling the rapid capturing of an impression of the three-dimensional shape and size of the entire foot, ankle, and lower leg simultaneously without the use of plaster of Paris.

The molding component means of the first mold component is a compressible material, such as a compressible foam, or combination of different compressible materials, specially formulated to be easily impressed with a shape and to retain the impressed shape in its exact form for an indefinite period of time. The protective component is a package or shell made of plastic, cardboard, or other disposable material.

The first mold component of the present invention preferably incorporates either two or three prefabricated pieces of compressible material. One of the prefabricated pieces is a lower rectangular block that is sufficiently large enough to support the weight or partial weight of the patient and to maintain the foot impression made. This lower block unit is used for creating the impression of the plantar and lower side regions of the foot and may be of a higher density material than that of the one or two prefabricated upper pieces. The higher density of the lower section is desired to allow for moderate resistance to gravitational forces under the foot. The one or two prefabricated upper pieces are such that their use allows for the making of an impression of the top of the foot, the ankle, and the lower leg in a relatively easy manner. A lighter-density compressible material, as compared to that used in the lower section, may be used in the upper sections to effect the impression of the top of the foot, ankle, and lower leg because, where gravity is not a factor, moderate resistance within the compressible foam is not required; light resistance would be sufficient. It is also desirable to have a more compressible foam in this upper section because it is more difficult to get an accurate impression in that area without the force exerted by the patient's partial or total weight.

One can imagine the appearance of these prefabricated units of compressible material as being a solid, rectangular block that is sliced horizontally creating two rectangular blocks, one being a lower block and the other being an upper block. The upper block is then sliced vertically creating two rectangular blocks disposed on top of the lower rectangular block. The blocks may be of equal dimensions, but when used for an anterior/posterior evaluation, they may be of unequal dimension. These blocks may then be encased in a shell made of cardboard or other disposable material. Such an optional shell may be designed such that the mold can be totally enclosed therein, giving protection to the compressible material for storage and mailing purposes.

There are numerous configurations of the protective shell that are possible. For instance, the shell could be a unitary, cardboard box that is specially designed, cut, perforated, and folded to contain the plurality of prefabricated pieces or blocks of compressible foam. Similarly, the container could be partially assembled containing the prefabricated pieces, and, after use, additional folds could be permitted for enclosing and protecting the individually impressed blocks. In another container design, the prefabricated blocks could be contained in their own section of the container. These sections, in turn, would be hinged together in an appropriate manner to facilitate the molding process without mess, loss of kit components, or damage to the compressible material. Alternatively, these individual sections may slide together along registration lines printed onto the outer shell. The outer shell would then have fold-out, protective flaps which would interlock and enclose the lower and upper sections, thus, preventing damage to the foam during shipping and storing.

Use of the present invention is rather easy. The user would simply open the completely self-contained casting system, effectively separating the lower section and the two upper sections from each other. Once separated, the user would first have the patient place his/her foot onto the lower section creating an impression of the patient's plantar region of the foot. While the patient's foot is still in the lower section's compressible foam, the user would bring the two upper sections in contact with the patient's top of his/her foot, ankle, and lower leg. The user would supply sufficient force to the upper sections so that these upper sections would not only be in contact with the lower section but they would also be in contact with each other around the foot, ankle, and leg. This is to ensure that the foot, ankle, and lower leg surfaces are all in contact with the compressible foam, forming the mold. As with all other casting systems, the user must be certain the foot-leg-knee relationships are held in the desired position during the casting process. Once this quick and easy molding process is completed, the user would then separate the two upper sections, allowing the patient to retract his/her foot from the mold. Next, the user would re-combine the two upper sections with the lower section and seal the formed foam in a manner previously described for storing or mailing.

A unique feature of the present invention is the ability to make a complete foot impression that includes the lower leg without the use of plaster of Paris or the use of an intricately-designed and expensive outer shell or container. This reduces the cost to the patient by the use of inexpensive materials absent the requirement of a release agent, while simultaneously reducing both the mess involved in making the custom mold and the chance for user error during the molding process. In addition, the present invention eliminates the need for any parting or releasing agent to be applied to the skin and the need for shaving the foot prior to casting.

There are additional qualities of the present invention which give it a uniqueness that is greatly preferable to prior plaster-molding systems. Plaster casts are generally taken when the person is sitting. As a result, elongation of the foot, or a "spreading out" of the foot's dimensions-something that occurs when the person stands up-is not captured. In fact, the overall shape of the foot under dynamic weight-bearing is not captured. Because the degree of elongation of the foot is quite variable from patient to patient and is dependent on ligamentous laxity, patient's weight, arch structure, etc., it is an important factor to be considered when fabricating custom-made shoes. When the plaster technique is used, it requires a weight-bearing tracing of the foot to be furnished with the plaster cast. This helps the lab estimate how long to make the interior of the shoe which, of course, increases the time, cost, and room for error associated with the fabrication. The present invention eliminates the need for a weight-bearing tracing in addition to the mold. In fact, the present invention allows accurate capture of the amount of elongation the foot undergoes during full weight-bearing or partial weight-bearing.

Furthermore, the present invention can be used to capture bony prominences such as metatarsal heads which become protuberant during partial and full weight-bearing. These dynamic changes in the shape of the foot typically cannot be captured in plaster techniques because of the minimal amount of weight applied during the casting process. The present invention also allows the use of a sock or socks during the molding process to increase the overall size of the foot while keeping the original contours of the bare foot. This might be useful in cases where the patient has recurring edema of the lower extremity and the shoes need to be fabricated slightly large in all dimensions.

In summary, the present invention is different from all the previous devices and has distinct advantages found in its design. The present invention makes use of two relatively simple components that are easily mass produced and relatively inexpensive to procure. Also, the present invention incorporates the advantages of a full-foot molding process with the ease and cost-effectiveness of current systems. These and other advantages will become evident upon review of the drawings, detailed description, and the claims of the present invention.

DETAILED DESCRIPTION OF THE PREFERRED EMBODIMENT

Figure 1:
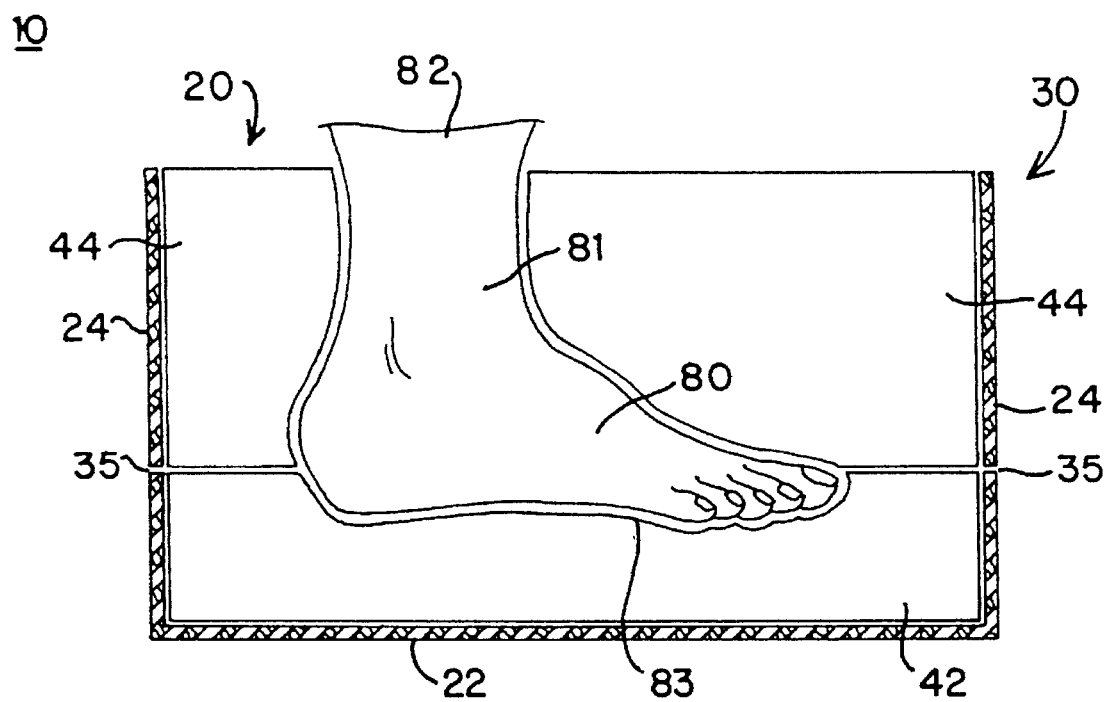
FIG. 1 is a longitudinal, cross-sectional view of the present invention with a patient's appendage creating an impression within the compressible material.

The general arrangement of the preferred embodiment of the present invention is illustrated in FIGS. 1–4B showing a foot-ankle-lower leg molding system 10 having a first mold component 20, which incorporates a molding component means, and a second mold component 30, which is a protective component. The molding system 10 is a completely self-contained system for creating the foot-ankle-lower leg impression.

The first mold component 20 has a lower block 42, a first upper block 44, and a second upper block 46. Blocks 42, 44, and 46 are prefabricated pieces made from compressible foam or a combination of compressible foams. These compressible foams, which may be either closed-cell or open-cell, are generally made from a high-molecular-weight polymer such as, preferably, closed-cell phenolic foam, polystyrene foams, as well as polyethylene foams. However, it is to be understood that new and different materials having the necessary qualities of compressibility with minimal rebound characteristics, may be substituted as they are developed.

The preferred composition of the first mold component 20 is such that the lower block 42 has a higher density than the density of the first upper block 44 and the second upper block 46. The higher density of the lower block 42 must be sufficient to allow moderate resistance to the gravitational forces under a foot 80, an ankle 81, and a lower leg 82 of a patient. A lower density compressible foam is preferably used for upper blocks 44 and 46. The lower density compressible foam is desirable for the upper blocks 44 and 46 because it is more difficult to obtain an accurate impression of the ankle 81 and the lower leg region 82 in that area without the force exerted by the patient's weight, or at least a portion of the patient's weight.

The second mold component 30 is a package or shell made of plastic, cardboard or other disposable material. The second mold component 30 may be made of a single, unitary construction having a plurality of folds, cuts, and perforations. One of the cuts 35 is shown in FIG. 1. In an alternative embodiment of the invention, however, the second mold component 30 may be formed of a plurality of separate elements that are joined together after the impression has been made. With continuing reference to the FIGURES, second mold component 30 has a plurality of parts consisting of a lower shell 22, a first upper shell 24, and a second upper shell 26. The lower shell 22 is affixed to the lower block 42, the first upper shell 24 is affixed to the first upper block 44, and the second upper shell 26 is affixed to the second upper block 46. Although the present invention is useable without fixing the first mold components 42, 44, and 46 to the second mold components 22, 24, and 26, it is preferred when considered from the user's viewpoint. Specially formulated adhesives may be used as the fixing agent for fixing the first mold components 42, 44, and 46 to the second mold components 22, 24, and 26, respectively. Besides the use of adhesives, other techniques for affixing the first mold components 42, 44, and 46 to the second mold components 22, 24, and 26 such as punching tabs into the combined mold components where the second mold components 22, 24, and 26 would indent into, and therefore capture, the first mold components 42, 44, and 46.

Figure 2A:
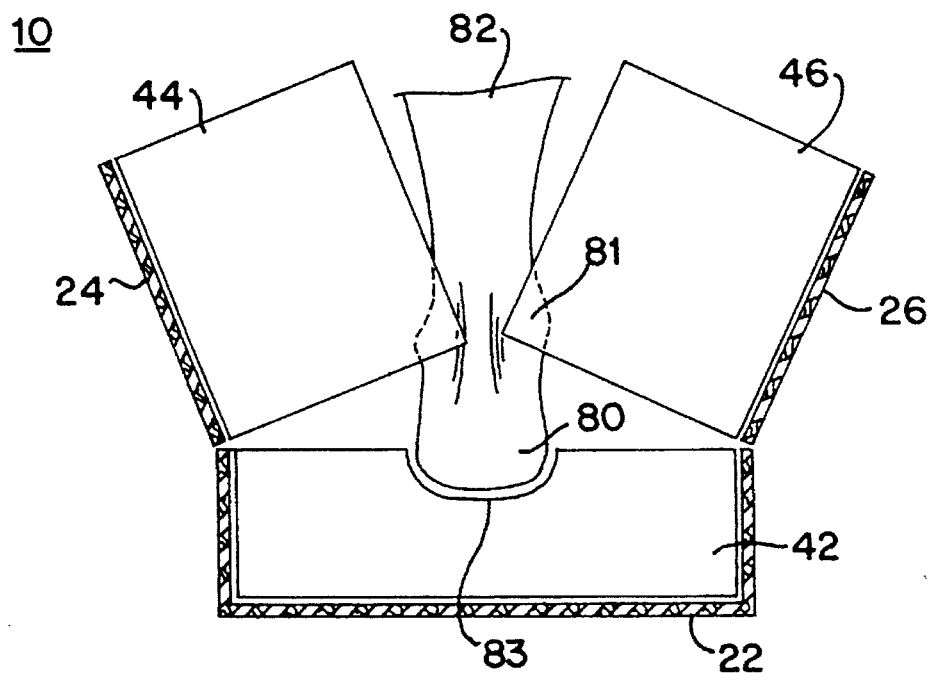
FIG. 2A is a cross-sectional end view of the present invention, showing hinged upper portions.
Figure 2B:
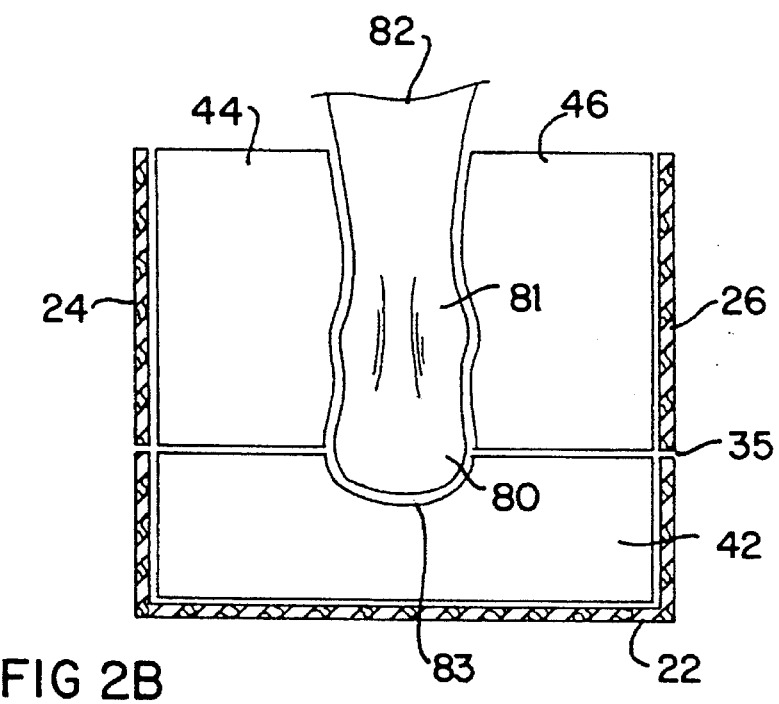
FIG. 2B is a cross-sectional end view of the present invention, showing the upper portions in position around the foot, ankle, and lower leg
Figure 3:
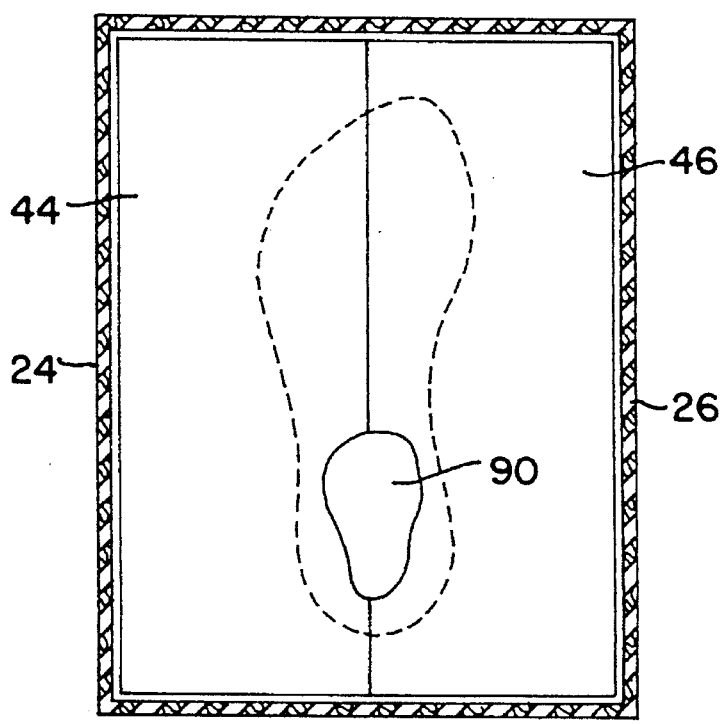
FIG. 3 is a plan view of the present invention after impression.

In use, the casting system 10 is opened by the user by separating the upper shells 24 and 26, to which the upper blocks 44 and 46 are securely attached, from the lower shell 22 and lower block 42, respectively. This is preferably achieved by having the upper blocks 44 and 46, which are hingedly connected to the lower block 42, pivoted outwardly away from each other so that the patient's foot 80 may be placed therebetween, as illustrated in FIG. 2A. Once the upper blocks 44 and 46 are separated, the user has the patient place his/her foot 80 onto the lower block 42 with sufficient force creating an impression of the patient's plantar region 83 of the foot. While the foot 80 is on the lower block 42, the first upper block 44 and the second upper block 46 are pivoted back toward the lower block 42 so as to encompass the patient's ankle 81 and lower leg 82, as illustrated in FIG. 2B. FIG. 3 shows the molding system 10 as completed, with the patient removed from the system 10, with upper blocks 44 and 46 rejoined, leaving only an impression opening 90 in the outline of the patient's lower leg 82. The molding process is thus completed, leaving the impression ready for shipment to a custom-shoe manufacturer. Using the molding system 10 and the process described herein substantially reduces the time, cost, and mess typically involved in current impression-making techniques.

Figure 4A:
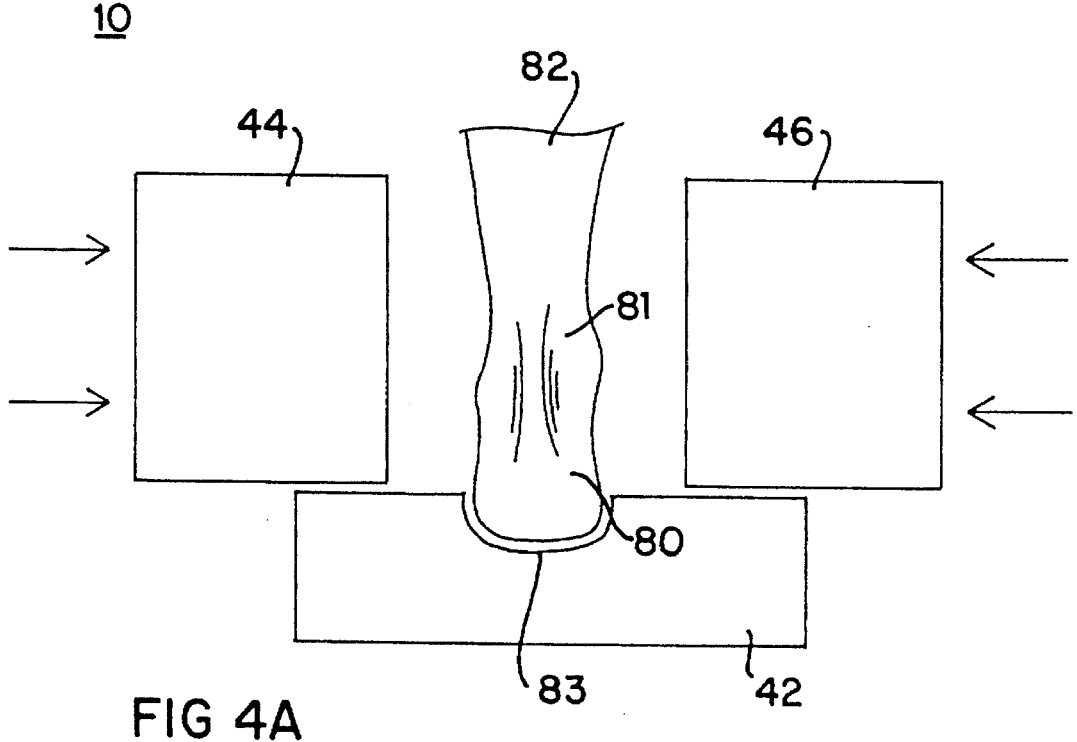
FIG. 4A is a cross-sectional end view of the present invention showing the upper block sections of the compressible foam before making the impression of the top of the foot, ankle, and lower leg.
Figure 4B:
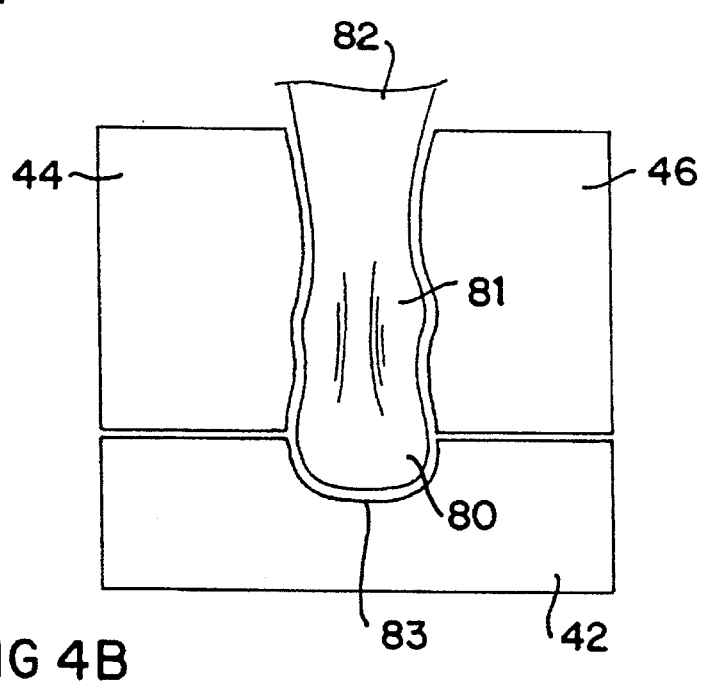
FIG. 4B is a cross-sectional end view of the present invention showing the upper block sections of the compressible foam after making the impression of the top of the foot, ankle, and lower leg.

In an alternative design of the molding system 10 of the present invention, the upper blocks 44 and 46 are not hingedly connected to the lower block 42. Instead, they are unattached pieces that are spread apart so that the patient's foot 80 may be placed between them. After the foot 80 has been placed on the lower block 42, upper blocks 44 and 46 are placed back on top of lower block 42 and pushed horizontally along the top of lower block 42 towards the patient's ankle 81 and lower leg 82. FIGS. 4A and 4B illustrate this technique. (FIGS. 4A and 4B show the lower block 42 and the upper blocks 44 and 46 without the second mold components 22, 24, and 26 attached for purposes of clarity.) FIG. 4A shows the directional movement of upper blocks 44 and 46 towards the foot 80 relative to the lower block 42. FIG. 4B shows a cross-sectional view of all three blocks 42, 44, and 46 immediately after the upper blocks 44 and 46 make contact with each other. Sufficient pressure is exerted by hand against the upper blocks 44 and 46 so that both blocks 44 and 46 touch each other with the foot 80 therebetween. Immediately after touching upper blocks 44 and 46 together, the user removes upper blocks 44 and 46 from around the foot 80 and removes the foot 80 from the lower block 42. The device is then re-combined and secured together, forming a package containing the newly made foot-ankle-lower leg impression. Even though FIGS. 4A and 4B show the making of the impression of a patient's inside and outside region of the ankle and lower leg, it should be understood that the present invention can also be configured such that upper blocks could be pushed horizontally from a posterior (back) and an anterior (front) position relative to the leg and foot. In order to assist the doctor in aligning the ankle in the anterior/posterior and medial/lateral directions with the point where the three mold sections meet/fold together, the present invention may have a registration line on the second mold components 22, 24, and 26.

Although the preferred embodiment of the present invention has been described in some detail herein, it is to be understood that this description is merely illustrative. The inventive apparatus may be modified in a variety of ways to suit a particular purpose while still employing the unique concepts set forth in the SUMMARY.

What is claimed is:

1. An apparatus for making a mold of a foot, an ankle, and a lower leg of a person comprising a molding component means having a first section contactable with a lower portion of said foot and a second section contactable with an upper portion of said foot and with said ankle and said lower leg, wherein said first section and said second section are fabricated of one or more compressible materials that when formed into a shape retains that shape for an extended period of time, and wherein said compressible material of said first section is of higher density than said compressible material of said second section.

2. The apparatus as claimed in claim 1 wherein said higher-density first section is sufficient to provide moderate resistance to the gravitational forces under said person.

3. The apparatus as claimed in claim 1 wherein said one or more compressible materials are compressible foams.

4. The apparatus as claimed in claim 3 wherein said compressible foams are closed-cell foams.

5. The apparatus as claimed in claim 4 wherein said closed-cell foams are high-molecular-weight polymers.

6. The apparatus as claimed in claim 1 wherein said second section is further divided into a plurality of blocks.

7. The apparatus as claimed in claim 6 wherein said plurality of blocks includes a first upper block and a second upper block.

8. The apparatus as claimed in claim 6 wherein each of said plurality of blocks is designed such that pressure exerted manually against said plurality of blocks is sufficient to create an impression where such pressure is exerted.

9. The apparatus as claimed in claim 1 wherein said molding component means is enclosed by a protective component.

10. The apparatus as claimed in claim 9 wherein said protective component is a single, unitary piece having a plurality of folds, cuts, and perforations.

11. The apparatus as claimed in claim 9 wherein said protective component is made of a disposable material.

12. The apparatus as claimed in claim 11 wherein said disposable material is plastic or cardboard.

13. The apparatus as claimed in claim 9 wherein said protective component has a plurality of parts.

14. The apparatus as claimed in claim 13 wherein said plurality of parts of said protective component include:

a. a lower shell in contact with said first section of said molding component means;

b. a first upper shell in contact with said second section of said molding component means; and c. a second upper shell in contact with said second section of said molding component means.

15. The apparatus as claimed in claim 13 wherein said protective component is securely affixed to said molding component means.

16. An apparatus for making a mold of a foot, an ankle, and a lower leg of a person comprising:

a molding component means having a first section contactable with a lower portion of said foot and a second section contactable with an upper portion of said foot and with said ankle and said lower leg, wherein said first section and said second section are fabricated of one or more compressible materials that when formed into a shape retains that shape for an extended period of time, wherein said first section is designed to provide moderate resistance to the gravitational forces under said person, said compressible materials being closed-cell compressible foams of high-molecular-weight polymers, wherein said second section is further divided into a plurality of blocks made of said closed-cell compressible foams designed such that pressure exerted manually against said plurality of blocks is sufficient to create an impression within said plurality of blocks, and wherein said compressible material of said first section is of higher density than said compressible material of said second section.

17. A method of making an impression of a foot, an ankle, and a lower leg simultaneously, said method comprising the steps of:

a. opening a mold-making device so as to access a first section of said device, said device including a compressible material;

b. placing a foot in said first section of said molding component means;

c. moving one or more blocks of a second section of said molding component means towards said foot, wherein said second section is formed of compressible material, of a density that is less than a density of said compressible material of said first section; and d. exerting force on said first section and said one or more blocks of said second section so as to create an impression of said foot, said ankle, and said lower leg in said compressible material.

18. The method as claimed in claim 17 further comprising the step of hingedly connecting said one or more blocks of said second section to said first section of said device.

* * * * *